(12) United States Patent
Sesia et al.

(10) Patent No.: US 10,075,879 B2
(45) Date of Patent: Sep. 11, 2018

(54) METHODS FOR DETECTING INTERFERERS FOR HANDLING INTERFERENCE MITIGATION

(71) Applicant: Telefonaktiebolaget LM Ericsson (publ), Stockholm (SE)

(72) Inventors: Stefania Sesia, Roquefort les Pins (FR); George Jöngren, Sundbyberg (SE); Bo Lincoln, Lund (SE); Lars Lindbom, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 137 days.

(21) Appl. No.: 15/113,580

(22) PCT Filed: Jan. 28, 2015

(86) PCT No.: PCT/SE2015/050084
§ 371 (c)(1),
(2) Date: Jul. 22, 2016

(87) PCT Pub. No.: WO2015/115975
PCT Pub. Date: Aug. 6, 2015

(65) Prior Publication Data
US 2017/0006501 A1  Jan. 5, 2017

Related U.S. Application Data

(60) Provisional application No. 61/934,742, filed on Feb. 1, 2014.

(51) Int. Cl.
H04W 28/18 (2009.01)
H04L 1/00 (2006.01)
(Continued)

(52) U.S. Cl.
CPC ........... *H04W 28/18* (2013.01); *H04J 11/005* (2013.01); *H04J 11/0043* (2013.01);
(Continued)

(58) Field of Classification Search
None
See application file for complete search history.

(56) References Cited

U.S. PATENT DOCUMENTS

2010/0309861 A1  12/2010  Gorokhov et al.
2011/0256861 A1*  10/2011  Yoo .................... H04L 5/005
                                                    455/423
(Continued)

OTHER PUBLICATIONS

3GPP TSG-RAN WG4 Meeting #68; Barcelona, Spain; Source: Intel Corporation; Title: Discussion on network assistance information for enhanced IS/IC receivers—Aug. 19-23, 2013.
(Continued)

*Primary Examiner* — Jamal Javaid
*Assistant Examiner* — Rosene Clark
(74) *Attorney, Agent, or Firm* — Sage Patent Group

(57) ABSTRACT

A method in a user equipment (605) is disclosed. The method comprises acquiring (704, 708) interference mitigation assistance parameters and granularity parameters, determining (712) one or more interfering cells (610B) for which a first strength measurement should be determined, determining (716) a first strength measurement for each of the determined one or more interfering cells, and ordering (720) the one or more interfering cells. The method further comprises identifying (724) from the ordered one or more interfering cells a first number of interfering cells having the strongest first strength measurements, determining (728) a second strength measurement for each of the identified first number of interfering cells, determining (732) one or more cells of the identified first number of interfering cells for which to perform cancellation of interference, and performing (736) cancellation of interference on the determined one or more cells of the identified first number of interfering cells.

22 Claims, 10 Drawing Sheets

(51) Int. Cl.
*H04J 11/00* (2006.01)
*H04L 5/00* (2006.01)
*H04W 72/04* (2009.01)
*H04W 88/02* (2009.01)
*H04W 84/04* (2009.01)

(52) U.S. Cl.
CPC .......... *H04L 1/0048* (2013.01); *H04L 5/0007* (2013.01); *H04W 72/042* (2013.01); *H04W 84/042* (2013.01); *H04W 88/02* (2013.01)

(56) References Cited

U.S. PATENT DOCUMENTS

| | | | |
|---|---|---|---|
| 2013/0089040 A1* | 4/2013 | Tabet | H04L 5/0048 370/329 |
| 2013/0260763 A1* | 10/2013 | Bhattad | H04W 36/0088 455/436 |
| 2014/0220990 A1* | 8/2014 | Lorca Hernando | H04J 11/005 455/450 |
| 2014/0334440 A1* | 11/2014 | Wong | H04W 36/0011 370/331 |

OTHER PUBLICATIONS

3GPP TSG-RAN WG4 Meeting #69; San Francisco, CA, US; Source: Intel Corporation; Title: Discussion on interference parameters signaling and detection for NAICS Nov. 11-15, 2013.

3GPP TR 36.866 v0.6.0; Technical Report; 3rd Generation Partnership Project; Technical Specification Group Radio Access Network; Network-Assisted Interference Cancellation and Suppression for LTE (Release 12) Nov. 2013.

PCT Written Opinion of the International Searching Authority for International application No. PCT/SE2015/050084—Apr. 29, 2015.

International Search Report for International application No. PCT/SE2015/050084—Apr. 29, 2015.

* cited by examiner

US 10,075,879 B2

METHODS FOR DETECTING INTERFERERS FOR HANDLING INTERFERENCE MITIGATION

PRIORITY

This nonprovisional application is a U.S. National Stage Filing under 35 U.S.C. § 371 of International Patent Application Ser. No. PCT/SE2015/050084 filed Jan. 28, 2015, and entitled "Methods For Detecting Interferers For Handling Interference Mitigation" which claims priority to U.S. Provisional Patent Application No. 61/934,742 filed Feb. 1, 2014, both of which are hereby incorporated by reference in their entirety.

TECHNICAL FIELD

The present disclosure relates, in general, to wireless communications and, more particularly, to methods and systems for detecting interferers for handling interference mitigation.

BACKGROUND

In a wireless network, a wireless device may communicate with one or more radio network nodes to transmit and/or receive voice traffic, data traffic, control signals, and so on. Maintaining good signal quality between the wireless device and the radio network node may allow for good performance, such as high bitrate transmissions or robust control channel performance. However, it may be difficult to maintain good signal quality in complex radio environments. For example, interfering cells may create noise that interferes with the signal quality.

FIG. 1 illustrates the basic LTE physical resource as a time-frequency grid. The physical layer transmission in LTE uses OFDM in the downlink and DFT-spread OFDM in the uplink. Thus, the basic LTE physical resource can be seen as a time-frequency grid as illustrated in FIG. 1, where each resource element corresponds to one subcarrier during one OFDM symbol interval. For example, resource element 110 corresponds to one subcarrier during one OFDM symbol interval.

FIG. 2 illustrates a radio frame 210 of a downlink LTE transmission in the time domain. In the time domain, LTE downlink transmissions are organized into radio frames, such as radio frame 210, of 10 ms. Each radio frame 210 includes ten equally-sized subframes of 1 ms, illustrated in FIG. 2 as subframes #0 through #9. A subframe, such as subframe #0, is divided into two slots, each of 0.5 ms time duration.

The resource allocation in LTE is described in terms of resource blocks (RB), where an RB corresponds to one slot in the time domain and 12 contiguous 15 kHz subcarriers in the frequency domain. Two in time consecutive RBs represent an RB pair, and correspond to the time interval upon which scheduling operates.

Transmissions in LTE are dynamically scheduled in each subframe where a network node base station (e.g., an eNodeB (eNB)) transmits downlink assignments/uplink grants to certain wireless devices (e.g., user equipment (UE)) via the physical downlink control channel (PDCCH), or the enhanced PDCCH (ePDCCH) introduced in LTE Rel. 11. In certain embodiments, the network node and wireless device may be network node 610 and wireless device 605 described below in relation to FIG. 6. In LTE downlink, data is carried by the physical downlink shared channel (PDSCH), and in the uplink the corresponding link is referred to as the physical uplink shared channel (PUSCH). The PDCCHs are transmitted in the first OFDM symbol(s) in each subframe and span (more or less) the whole system bandwidth, whereas ePDCCH is mapped on RBs within the same resource region as used for PDSCH. Hence, ePDCCHs are multiplexed in the frequency domain with the PDSCH, and may be allocated over the entire subframe. A UE that has decoded an assignment carried by a PDCCH, or ePDCCH, knows which resource elements in the subframe contain data aimed for the UE. Similarly, upon receiving an uplink grant, the UE knows which time/frequency resources it should transmit upon.

Demodulation of sent data requires estimation of the radio channel, which is done by using transmitted reference symbols (RS), i.e. symbols known by the receiver. In LTE, cell specific reference symbols (CRS) are transmitted in all downlink subframes and in addition to assist downlink channel estimation they are also used for mobility measurements performed by the UEs. LTE also supports UE specific RS, i.e. demodulation reference signals (DMRS), for assisting channel estimation for demodulation purposes.

FIG. 3 illustrates how the mapping of PDCCH and PDSCH and CRS can be done on resource elements within a downlink subframe 310. Downlink subframe 310 includes control region 320 and data region 330. In FIG. 3, the PDCCHs occupy the first out of three possible OFDM symbols, so in this particular case the mapping of data carried by PDSCH could start already at the second OFDM symbol. Since the CRS is common to all UEs in the cell, the transmission of CRS cannot be easily adapted to suit the needs of a particular UE. This is in contrast to DMRS, which means that each UE has reference signals of its own placed in the data region 330 of FIG. 3 as part of PDSCH. In LTE, subframes can be configured as MBSFN subframes, which implies that CRSs are only present in the PDCCH control region.

The length of the PDCCH control region 320, which can vary on subframe basis, is conveyed in the physical control format indicator channel (PCFICH). The PCFICH is transmitted within control region 320, at locations known by UEs. After a UE has decoded the PCFICH, it thus knows the size of control region 320 and in which OFDM symbol the data transmission starts. Also transmitted in control region 320 is the physical hybrid-ARQ indicator channel (PHICH). This channel carries ACK/NACK responses to a UE to inform if the uplink data transmission in a previous subframe was successfully decoded by the base station or not.

In LTE, DMRSs are introduced in order to allow for demodulation of data based on UE specific RSs. These RSs are placed in data region 330, and are described in more detail in FIG. 4.

FIG. 4 illustrates an example of UE-specific reference symbols. R7 and R9 represent the DMRSs corresponding to antenna port 7 and 9, respectively. In addition, antenna port 8 and 10 can be obtained by applying an orthogonal cover as (1-1) over adjacent pairs of R7 and R9, respectively As previously indicated, CRS and DMRS are not the only reference symbols available in LTE. As of LTE Rel. 10, a new RS concept was introduced with separate UE specific RS for demodulation of PDSCH and RS for measuring the channel for the purpose of channel state information (CSI) feedback from the UE. The latter is referred to as CSI-RS. CSI-RS are not transmitted in every subframe, and they are generally sparser in time and frequency than RS used for demodulation. CSI-RS transmissions may occur every 5th, 10th, 20th, 40th, or 80th subframe, according to an RRC configured periodicity parameter and an RRC configured subframe offset.

FIG. 5 illustrates the resource elements within a resource block pair that may potentially be occupied by UE specific RS and CSI-RS. The CSI-RS utilizes an orthogonal cover code of length two to overlay two antenna ports on two consecutive REs. As illustrated in FIG. 5, many different CSI-RS patterns are available. As one example, there may be two CSI-RS antenna ports as illustrated in CSI-RS pattern 510. In certain embodiments, where there are two CSI-RS antenna ports, there are twenty different patterns within a subframe. As another example, there may be four CSI-RS antenna ports, as illustrated in CSI-RS pattern 520, or eight CSI-RS antenna ports, as illustrated in CSI-RS pattern 530. The corresponding number of patterns is 10 and 5 for four and eight CSI-RS antenna ports, respectively. For TDD, some additional CSI-RS patterns are available.

Subsequently, the term CSI-RS resource may be mentioned. In such a case, a resource corresponds to a particular pattern present in a particular subframe. Thus, two different patterns in the same subframe, or the same CSI-RS pattern but in different subframes, in both cases constitute two separate CSI-RS resources.

The CSI-RS patterns may also correspond to so-called zero-power CSI-RS, also referred to as muted REs. Zero-power CSI-RS corresponds to a CSI-RS pattern whose REs are silent, i.e., there is no transmitted signal on those REs. Such silent patterns are configured with a resolution corresponding to the 4 antenna port CSI-RS patterns 520 illustrated in FIG. 5. Hence, the smallest unit to silence corresponds to four REs.

Conveying indications of physical layer resource allocation is one of the major functions of PDCCH (and now ePDCCH). In each subframe this control channel indicates the PDSCH resource allocations. Several resource allocation types are defined in LTE. As one example, the resource allocation type may be resource type allocation 0, where a bitmap indicates the Resource Block Group (RBG) which are allocated to the scheduled UE, where the RBG is a set of consecutive PRBs whose size depend on the system bandwidth. For example, the number of RBG when NRBDL available PRBs are present is given by P obtained as $N_{RBG} = \text{ceil}(N_{RB}^{DL}/P)$ As another example, the resource type allocation may be resource allocation type 1, where individual PRBs can be addressed, but only within a subset of PRBs available within the RBG. This resource type allocation allows spreading in frequency domain to be achieved, which exploits frequency diversity. As yet another example, the resource allocation may be resource allocation type 2, where the resource allocation information indicates a contiguous set of PRB, using either localized or distributed mapping. Resource allocations can be localized, meaning that a PRB in the first half of a subframe is paired with the PRB at the same frequency in the second half of the subframe, or distributed meaning that the two physical RBs in a PRB pair are separated in frequency domain. This achieves better frequency diversity when a small amount of data has to be transmitted. Under resource allocation type 2, the PRB allocation may vary from a single PRB up to a maximum number of PRBs spanning the entire system bandwidth.

SUMMARY

To address the foregoing problems with existing solutions, disclosed is a method in a user equipment. The method comprises acquiring one or more interference mitigation assistance parameters, acquiring one or more granularity parameters, and determining one or more interfering cells for which a first strength measurement should be determined, the determination of the one or more interfering cells for which a first strength measurement should be determined based at least in part on the one or more interference mitigation assistance parameters. The method also comprises determining a first strength measurement for each of the determined one or more interfering cells, ordering the one or more interfering cells based at least in part on the first strength measurement for each of the determined one or more interfering cells and the one or more granularity parameters, and identifying from the ordered one or more interfering cells a first number of interfering cells having the strongest first strength measurements. The method also comprises determining a second strength measurement for each of the identified first number of interfering cells, determining one or more cells of the identified first number of interfering cells for which to perform cancellation of interference, and performing cancellation of interference on the determined one or more cells of the identified first number of interfering cells.

In certain embodiments, acquiring one or more interference mitigation assistance parameters may further comprise receiving information from a network node, the information comprising one or more of a number of interfering cells for which a wideband power measurement should be performed by the user equipment, a number of interfering cells for which the user equipment detects the presence of interference on one or more channels, and a number of interfering cells for which the user equipment performs cancellation of interference. Acquiring one or more interference mitigation assistance parameters may further comprise autonomously defining, at the user equipment, the one or more interference mitigation assistance parameters, the one or more interference mitigation assistance parameters comprising a number of interfering cells for which a wideband power measurement should be performed by the user equipment, a number of interfering cells for which the user equipment detects the presence of interference on one or more channels, and a number of interfering cells for which the user equipment performs cancellation of interference. The first strength measurement may be based at least in part on one or more reference symbols commonly available in a cell, and the second strength measurement may be based at least in part on an actual transmitted physical downlink shared channel power of the identified first number of interfering cells.

Also disclosed is a user equipment. The user equipment includes one or more processors. The one or more processors are configured to acquire one or more interference mitigation assistance parameters, and acquire one or more granularity parameters. The one or more processors are configured to determine one or more interfering cells for which a first strength measurement should be determined, the determination of the one or more interfering cells for which a first strength measurement should be determined based at least in part on the one or more interference mitigation assistance parameters. The one or more processors are configured to determine a first strength measurement for each of the determined one or more interfering cells, and order the one or more interfering cells based at least in part on the first strength measurement for each of the determined one or more interfering cells and the one or more granularity parameters. The one or more processors are configured to identify from the ordered one or more interfering cells a first number of interfering cells having the strongest first strength measurements, and determine a second strength measurement for each of the identified first number of interfering cells. The one or more processors are configured to determine one or more cells of the identified first number of interfering cells for which to perform cancellation of interference, and perform cancellation of interference on the determined one or more cells of the identified first number of interfering cells.

Also disclosed is a method in a network node. The method comprises communicating one or more interference mitigation assistance parameters to a user equipment. The method also comprises determining one or more granularity parameters, the one or more granularity parameters to be used by the user equipment to order one or more interfering cells, and communicating the determined one or more granularity parameters to the user equipment.

In certain embodiments, the one or more interference mitigation assistance parameters may comprise one or more of a number of interfering cells for which a wideband power measurement should be performed by the user equipment, a number of interfering cells for which the user equipment detects the presence of interference on one or more channels, and a number of interfering cells for which the user equipment performs cancellation of interference. The one or more interference mitigation assistance parameters may also comprise an instruction for the user equipment to autonomously define one or more of the interference mitigation assistance parameters. The one or more granularity parameters may be selected from a group including a frequency granularity and a time domain granularity. The frequency granularity may be per physical resource block or any group of physical resource blocks within an allocated bandwidth. The time domain granularity may be per slot, per subframe, or a group of subframes. In certain embodiments, the one or more granularity parameters may comprise an indication to the user equipment that a granularity used to order the one or more interferers should be based at least in part on information related to resource scheduling. The network node may be a serving node of the user equipment, and/or a cell on a primary carrier. The one or more channels may include a physical downlink shared channel.

Also disclosed is a network node. The network node includes one or more processors. The one or more processors are configured to communicate one or more interference mitigation assistance parameters to a user equipment. The one or more processors are configured to determine one or more granularity parameters, the one or more granularity parameters to be used by the user equipment to order one or more interfering cells. The one or more processors are configured to communicate the determined one or more granularity parameters to the user equipment.

Certain embodiments of the present disclosure may provide one or more technical advantages. For example, some embodiments may lower wireless device complexity while improving the demodulation performance. As another example, more reliable blind detection of the transmission parameters associated with the interferers may result, which may in turn result in better interferer channel estimation and better demodulation performance. As yet another example, certain embodiments may improve the demodulation performance and reduce the number of interferers to be cancelled.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Embodiments of the present disclosure may facilitate reducing interference associated with an interfering cell. Under advanced receiver techniques capable of handling neighbor cell interference, the detection and estimation of the strongest interferer(s) is important. Particular embodiments implement methods in a wireless device or UE and methods in a network node. Some embodiments may be implemented in 3GPP LTE systems as well as WCDMA, WiMax, UMB, GSM and other types of wireless systems. Particular embodiments can be implemented in wireless transmissions in the downlink from a network node to a wireless device or in the uplink.

Figure 1:
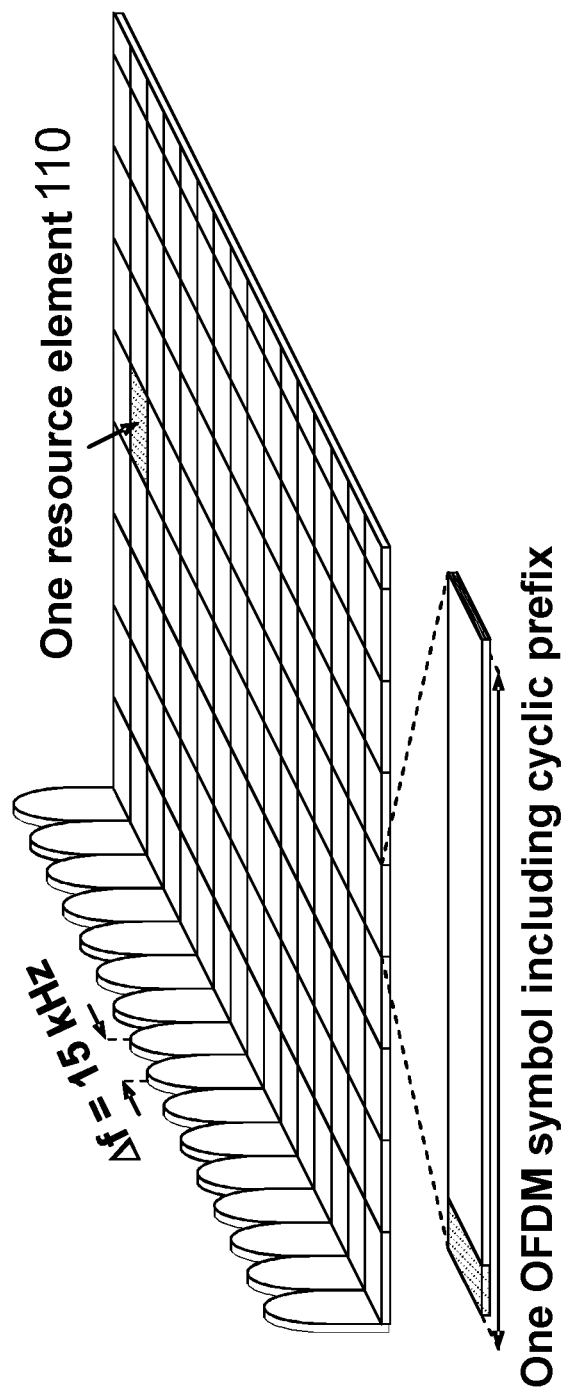
FIG. 1 illustrates the basic LTE physical resource as a time-frequency grid.
Figure 2:
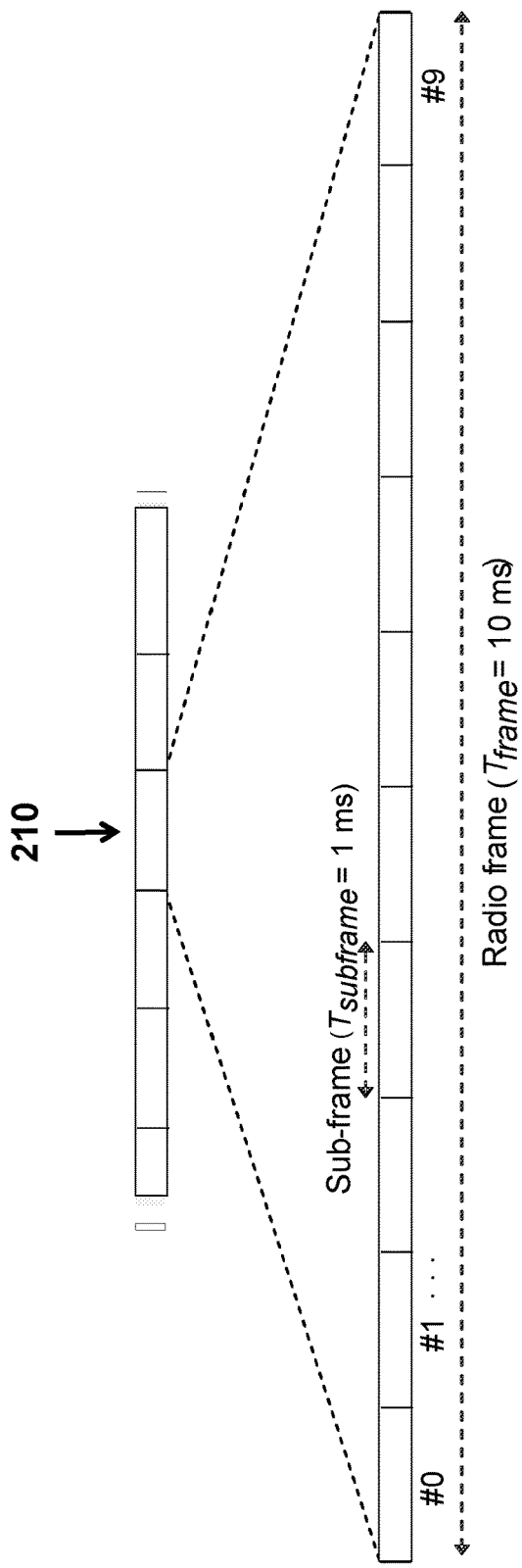
FIG. 2 illustrates a radio frame of a downlink LTE transmission in the time domain.
Figure 3:
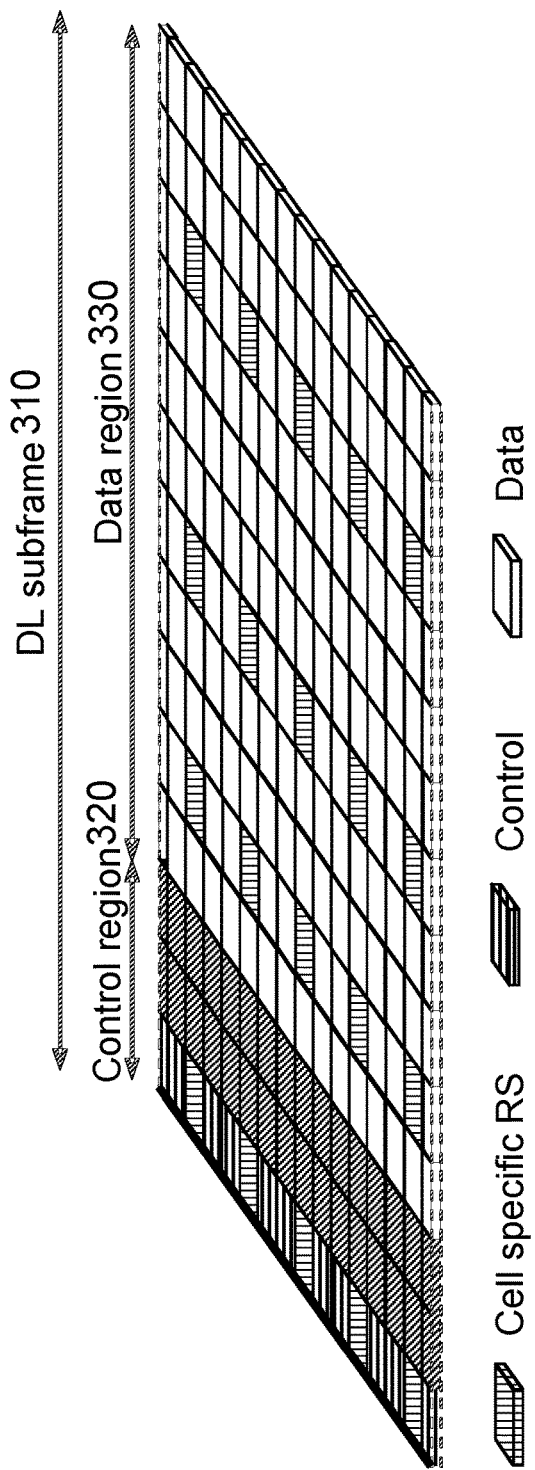
FIG. 3 illustrates how the mapping of PDCCH and PDSCH and CRS can be done on resource elements within a downlink subframe.
Figure 4:
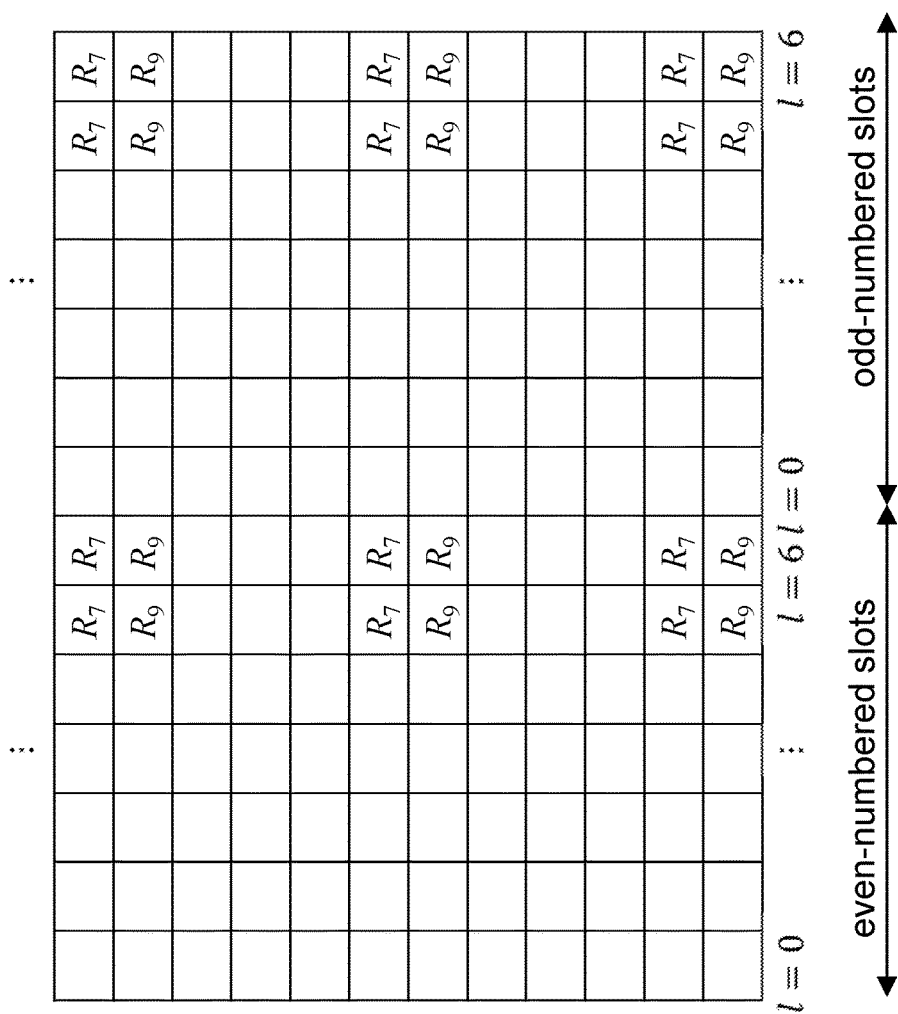
FIG. 4 illustrates an example of UE-specific reference symbols.
Figure 5:
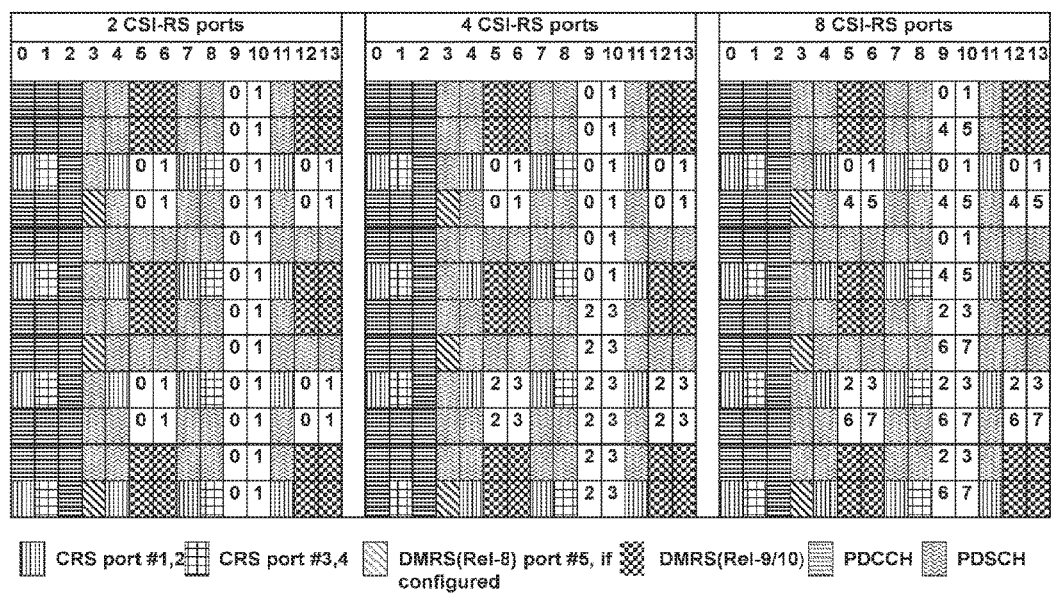
FIG. 5 illustrates the resource elements within a resource block pair that may potentially be occupied by user equipment specific reference symbols and channel-state-information reference symbols.
Figure 6:
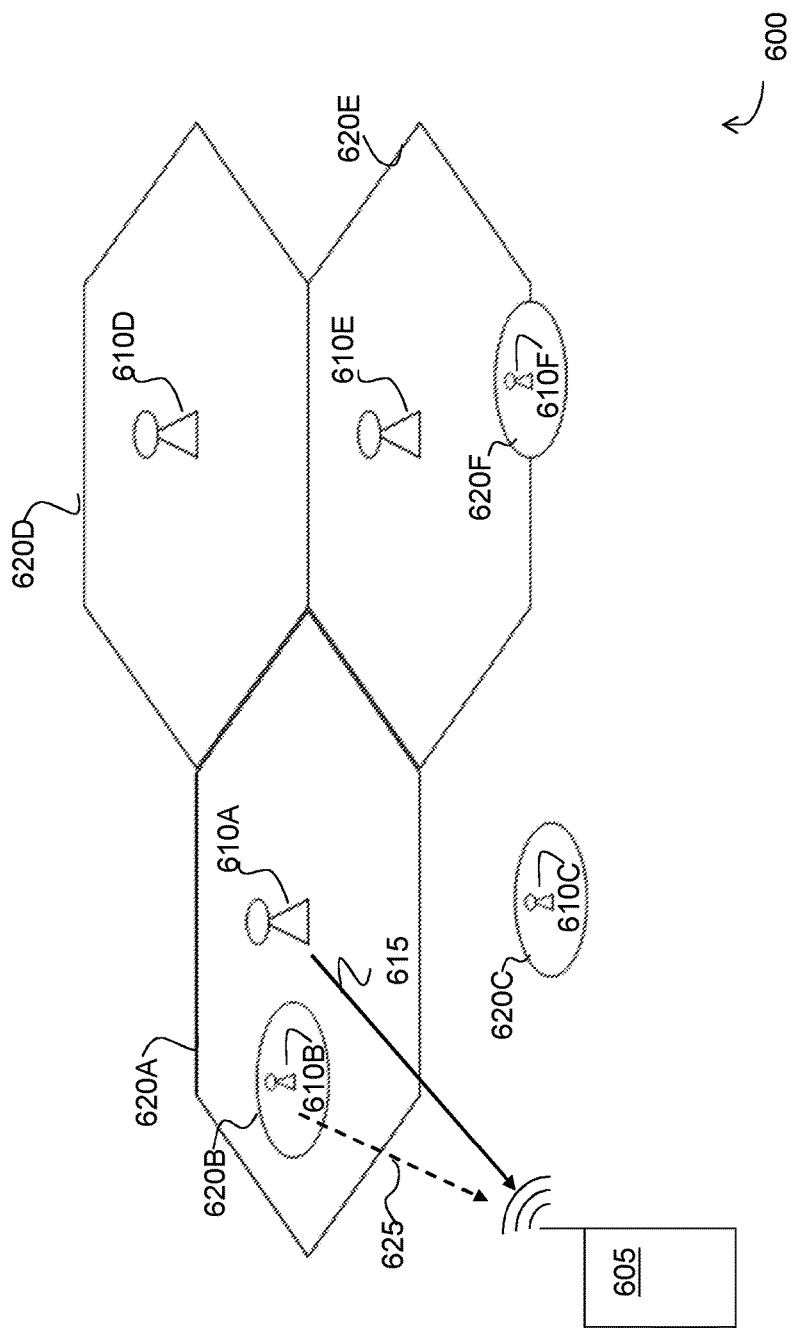
FIG. 6 is a block diagram illustrating a network that includes a wireless device and a plurality of network nodes, according to certain embodiments.

FIG. 6 is a block diagram illustrating embodiments of a network 600 that includes a wireless device 605 and a plurality of network nodes 610, according to certain embodiments. Each network node 610 may have an associated coverage area 620. For example, network node 610A may have associated coverage area 620A, and network node 610B may have associated coverage area 610B. When wireless device 605 is within the coverage area associated with a network node 610, such as target node 610A, wireless device 605 may communicate with the target node to transmit and/or receive a target signal 615. Target node 610A may be a serving cell or another cell of interest to wireless device 605, and target signal 615 may include voice traffic, data traffic, control signals, and/or any other suitable information communicated between wireless device 605 and target node 610A.

Network nodes 610 may be any suitable type of network node. Throughout the present disclosure, the use of the term network node may include an eNode B, node B, base station, wireless access point (AP), base station controller, radio network controller, relay, donor node controlling relay, base transceiver station (BTS), transmission point, transmission node, RRU, RRH, nodes in distributed antenna system (DAS), core network node, MME, or any other suitable type of node that may communicate directly or indirectly with a wireless device. Wireless device 605 may communicate with network nodes 610 over a wireless interface. For example, wireless device 605 may transmit wireless signals to network nodes 610 and/or receive wireless signals from network nodes 610. The wireless signals may contain voice traffic, data traffic, and control signals, for example. In certain embodiments, a network node 610 may be a core network node, and manage the establishment of communication sessions and various other functionality for wireless devices 605. The network nodes 610 may connect through an interconnecting network, which may include any interconnecting system capable of transmitting audio, video, signals, data, messages, or any combination of the preceding. Examples of wireless device 605 and network node 610 are described below with respect to FIGS. 9 and 10, respectively.

In network 600, each network node 610 may use any suitable radio access technology, such as long term evolution (LTE), LTE-Advanced, UMTS, HSPA, GSM, cdma2000, WiMax, WiFi, and/or other suitable radio access technology. Network nodes 610 may be deployed throughout network 600 as a homogenous deployment, heterogeneous deployment, or mixed deployment. A homogeneous deployment may generally describe a deployment made up of the same (or similar) type of radio network nodes and/or similar coverage and cell sizes and inter-site distances. A heterogeneous deployment may generally describe deployments using a variety of types of radio network nodes having different cell sizes, transmit powers, capacities, and inter-site distances. For example, a heterogeneous deployment may include a plurality of low-power nodes placed throughout a macro-cell layout. Deploying low-power nodes throughout a macro-cell layout may extend capacity in certain traffic hotspots, however, the differences in the various nodes (such as differences in transmit power) may tend to increase the complexity of managing interference in the uplink and/or in the downlink as compared to a homogenous deployment. Mixed deployments may include a mix of homogenous portions and heterogeneous portions.

Wireless device 605 may be impacted by an interfering signal 625 from an interfering node, such as interfering node 610B (e.g., an aggressor cell or neighboring cell) in FIG. 6. Interfering signal 625 may interfere with wireless device 605's ability to receive target signal 615 clearly, which may cause performance problems like lower bitrate transmissions between wireless device 605 and target node 610A. Interfering signal 625 may tend to be stronger/cause greater interference when wireless device 605 is located near interfering node 610B.

Wireless device 605 may support interference mitigation capabilities to fully or partly eliminate the interference due to interfering signal 625. The term interference mitigation (IM) may be used interchangeably with any of the following similar terms: interference cancellation (IC), interference elimination, interference suppression, interference reduction, interference minimization, and so on. An ability of wireless device 605 to cancel interference might or might not be improved with the use of assistance information from a network node 610 depending on the configuration of wireless device 605. The present disclosure contemplates various embodiments that may enable or facilitate the estimation and/or detection of strongest interferers to improve interference cancelation. Although the present disclosure describes many embodiments in the context of network nodes 610A and 610B, the described embodiments may be equally applicable to any suitable scenario in network 600 in which wireless device 605 may be affected by an interfering node.

Interference mitigation on the transmitter side refers to methods that aim to coordinate the physical channel transmissions across cells to avoid severe interference. One example is when an aggressor base station occasionally mutes its transmissions on certain radio resources in order for a victim cell to schedule interference sensitive UEs on radio resources with reduced interference. For example, interfering network node 610B may mute its transmissions on certain radio resources in order for network node 610A, the victim cell, to schedule wireless device 605 on radio resources with reduced interference. LTE features to coordinate transmissions have been specified in the context of inter-cell interference coordination (ICIC) and coordinated multipoint transmissions (CoMP). In the case of ICIC, an eNB, such as one of the network nodes 610 illustrated in FIG. 6, sends a message over the LTE inter-eNB interface X2 with coordination information that a receiving eNB can take into account when scheduling interference sensitive users. For example, in certain embodiments network node 610B may send a message over the LTE inter-eNB interface X2 to network node 610A. The message may include coordination information that network node 610A can take into account when scheduling interference sensitive users, such as wireless device 605. In the case of CoMP, a cluster of transmission points, or base stations, can jointly and synchronously transmit the same signals to a UE, such as wireless device 605, and by then increase the received power on the desired signals. Alternatively, it can, as in the ICIC case, coordinate the transmissions to avoid inter-point interference. For example, in certain embodiments one or more network nodes, such as network nodes 610A and 610B, may jointly and synchronously transmit the same signals to wireless device 605.

Various ICIC messages over X2 have been specified in TS 36.423. One example is UL Overload Interference Indication (OII). OII indicates per RB the interference level (low, medium, high) experienced by the indicated cell on all RBs. Another example is UL High Interference Indication (HII), which indicates per RB the occurrence of high interference sensitivity, as seen from the sending eNB. As yet another example, Received Narrow Transmit Power (RNTP) indicates per RB whether DL transmission power is lower than the value indicated by a threshold. Another example is Almost Blank Subframe (ABS) pattern, which indicates the subframes the sending eNB will reduce power on some physical channels and/or reduced activity.

The X2 messages OII, HII and RNTP were specified in LTE Rel. 8, and represent methods for coordinating physical data channel transmissions in the frequency domain across cells. The ABS message, however, was specified in LTE Rel. 10 as a time domain mechanism to primarily protect reception of PDCCH, PHICH, and PDSCH in the small cells by letting macro cells occasionally mute, or reduce transmit power on PDCCH/PDSCH in certain subframes. The eNB ensures backwards compatibility towards UEs by still transmitting necessary channels and signals in the ABS for acquiring system information and time synchronization.

On the receiver side of techniques to mitigate inter-cell interference, interference rejection combining (IRC) is a well-known receiver type for suppressing interference and requires estimation of an interference/noise covariance matrix. Other receiver types for interference mitigation are those based on explicit interference cancellation (IC), in which unwanted received signals (intra/inter-cell interference) are estimated and subtracted from the received signals. Still other receiver types for interference mitigation are those based on the maximum likelihood approach, in which the best serving cell signal candidate is detected taking into account (in a joint way) the interferer signals. Both IRC and IC are, since 3GPP Rel. 11, established as UE reference receiver techniques in LTE. However, IC in LTE Rel. 11 was restricted to cancellation of always-on signals, such as the CRS in which the network assists the UE on how these signals are transmitted in the aggressor cells, such as network node 610B. There is currently an ongoing LTE Rel. 12 study on network assisted interference cancellation and suppression of interference corresponding to scheduling of data.

Inter-cell interference is often one of the dominant impairments limiting receiver performance and the achievable data rates in cellular networks, such as network 600. In traditional, linear receivers, multiple antennas, spatial selectivity and IRC weight design have been used to mitigate such interference.

More advanced receivers employing enhanced interference suppression schemes, maximum likelihood techniques and IC techniques are gaining popularity for mitigating DL interference arising from neighbor-cell transmissions to UEs in those cells. Such receivers may be used to explicitly remove all or parts of the interfering signal. As an example, an IC receiver in the victim wireless device 605 may be used to demodulate and optionally decode the interfering signals 625, producing an estimate of the transmitted and the corresponding received signal, and removing that estimate from the total received signal to improve the effective signal-to-interference-plus-noise ratio (SINR) for the desired target signal 615. In post-decoding IC receivers, the interfering data signal 625 is demodulated and decoded, and its estimated contribution to the received signal is regenerated and subtracted. In pre-decoding receivers, the regeneration step is performed directly after demodulation, bypassing the channel decoder. The preferred mode to perform such cancellation is by applying soft signal mapping and regeneration, as opposed to hard symbol or bit decisions. ML receivers can as well be used to jointly detect the target signal 615 and interfering signal 625, in accordance with the ML criterion. Additionally, iterative ML receivers can be defined which exploit the decoding of interfering signal(s) 625.

To apply these advanced receivers to signals originating from other cells, knowledge of certain signal format parameters may be required to configure the receiver. For pre-decoding IC, the resource allocation, modulation format, any pre-coding applied, the number of layers, etc. may be useful, and may be obtained via blind estimation, eavesdropping other-cell control signaling, or via network assistance features. For post-decoding, additional transport format parameters are required which may typically only be obtained from receiving or eavesdropping the related control signaling.

The two approaches differ by the achievable cancellation efficiency, e.g. the fraction of the impairment power left after the cancellation operation. In some scenarios, they may be essentially equal, while in others they may vary significantly, with the post-decoding IC approach typically providing superior performance at "high" SINR operating points. The two approaches typically also differ by the computational resources required (e.g., the post-decoding solution implies turbo decoding processing) and by the processing delay incurred (e.g., the post-decoding solution requires buffering the entire code block of the interfering signal).

In general, the UE complexity and whether or not blind detection of the parameters has to be performed may be directly proportional to the amount of interference the UE has to cancel in order to get sufficiently good performance. In addition, blind detection of the parameters is more reliable for strong interferers (for sufficiently high interfering cell SINR).

In some cases, when UE 605 is equipped with an advanced receiver capable of handling neighbor cell interference, such as IC-, ML-based receivers, the detection and estimation of the strongest interferer(s) can be an important step. Issues may currently exist with respect to how UE 605 detects the strongest interferer and the signaling for UE 605 to indicate which cell(s) to cancel.

Previously, when CRS-IC was developed in LTE Rel. 11, assistance information was provided which includes information such as interfering cell ID, CRS APs, and MBSFN configurations of up to a maximum amount of cells. Thus, UE 605 was able to detect the strongest interfering cell among the one signaled by the network by estimating the received power level over the entire system bandwidth (as CRSs are cell specific CRSs which span the entire system bandwidth). However, the difference between CRS and PDSCH cancellation is that CRSs are always present, and they span the entire bandwidth. PDSCH can be scheduled in a localized or distributed manner in frequency domain and, in the worst case, the scheduling granularity can be as small as the PRB (180 KHz×0.5 ms), depending on the eNodeB resource allocation type. In addition the PDSCH allocation depends on the interfering cell load, and it can have an ON/OFF behavior.

Hence, it may not be clear which strategy and how many interferers UE 605 has to explicitly take into account in order to optimize its performance. Intuitively the strongest interferer should be canceled, but it may not be clear or defined how UE 605 detects the strongest interferer and which granularity is used in order to detect such strongest interferer(s). It is likely that UE 605 will order the neighbor cell interference by considering wideband power measurements obtained by measuring averaged CRS interference power within the scheduled or the entire bandwidth. This methodology, however, will not necessarily give correct information related to the actual level of the PDSCH interference for that particular cell with fine granularity. This methodology may lead to a strategy which consists of cancelling the strongest cell in average, which may lead to a consequent increase in the amount of total interferers which UE 605 has to cancel in order to achieve good performance. In fact, the strongest interference may change in frequency domain and in time domain depending on, for example, the channel characteristics (how frequency selective is the channel) or the scheduling allocation. If the estimation of the strongest interferer is averaged over the entire (or the scheduled) bandwidth, it may be so that the second or third dominant interferer becomes the strongest for a certain amount of PRBs. Hence, there may be a consideration of cancellation of several interferers in order to make sure that the strongest interferer is always canceled, which leads to highly increased UE complexity.

In order to implement network assisted interference cancellations (NAICS), UE 605 may need to acquire certain information such as RI, modulation order, PMI, TM, or any other suitable information. A potential blind detection algorithm could be described as including the following steps:

1. Cell RSRP power measurements based on PSS and SSS signals;
2. Channel estimation of the neighbor cells based on CRS or DMRS;

3. Neighbor cells covariance detection, which allows estimating parameters such as RI, TM, precoder; and 4. Modulation and further precoder detection and signal reconstruction and cancellation If UE 605 does not have proper information, or if it does not detect the correct interferer to cancel, it will perform the above steps for a high number of interferers. Alternatively, a careful selection of the strongest interferer would lead to an optimized and reduced amount of steps 2-4 that UE 605 has to perform to achieve good performance. The present disclosure contemplates various embodiments that may improve upon these methods to reduce complexity in the interference cancellation procedure. The present disclosure contemplates that the disclosed methods may apply to at least both CRS-based transmission modes and UE specific RSs transmission modes.

As described above, in LTE, two types of cell specific RSs are sometimes used: CRSs and CSI-RS (in Rel. 10), both spanning the entire bandwidth. In certain embodiments, UE 605 specific RSs such as DMRSs are typically transmitted in the same manner as the corresponding data, so in that case the complete channel may be determined by UE 605 specific RS. This, however, may not be the case when interfering signal 625 is associated to CRS since the channel over which the data symbols are transmitted may be scaled differently than the channel seen by CRS. Similarly, the power/energy of the transmitted data symbols may differ from the power/energy of the transmitted symbols corresponding to CRS. Signaling has been provided and described in some disclosures that help UE 605 acquire parameters such as PA, PB, which represent the transmit power/energy ratio between data and CRS.

In particular embodiments, a user equipment, such as wireless device 605, performs estimation and detection of the strongest interferer according to one or more of the following steps.

In certain embodiments, wireless device 605 acquires interference mitigation assistance parameters from a network node, such as an eNodeB. As one example, wireless device 605 may acquire an interference mitigation assistance parameter indicating the number of interferers wireless device 605 has to measure wideband power on. To illustrate, network node 610A may provide interference mitigation assistance parameters to wireless device 605 on the number of interferers wireless device 605 has to measure wideband power on, which may include network node 610B. In certain embodiments, the number of interferers can be represented as P, where P may be configured by network 600. Alternatively, in certain embodiments P may be autonomously decided by UE 605, depending on its capability, complexity and battery saving needs. In certain embodiments, wireless device 605 may determine the P strongest interfering cells by measuring averaged interference power within scheduled bandwidth. Wireless device 605 may estimate the narrowband power of these interferers.

Wireless device 605 may acquire one or more granularity parameters from a network node on the groups of (consecutive or nonconsecutive) PRB over which to order interferers. For example, wireless device 605 may acquire one or more granularity parameters from network node 610A. In some cases, wireless device 605 may autonomously determine the groups of PRBs by examining the frequency selectivity of the channel. In certain embodiments, wireless device 605 may order the interferers in any suitable manner. As one example, wireless device 605 may order the interferers considering the estimation per groups of PRB as configured by the eNodeB. As another example, the order of interferers may be autonomously decided by wireless device 605 within scheduled bandwidth.

In certain embodiments, wireless device 605 may acquire an interference mitigation assistance parameter on the number of interferers for which wireless device 605 has to detect whether PDSCH is present or not and cancel. In certain embodiments, the number of interferers for which wireless device 605 has to detect whether PDSCH is present or not can be represented as "K," and the number of interferers for which wireless device 605 has to cancel can be represented as "N." Wireless device 605 may detect, if needed, the presence of PDSCH interference by estimating a covariance matrix per group of PRBs for the first K strongest interferers. K may be determined in any suitable manner. As one example, K may be configured by network 600. As another example, K may be autonomously decided by wireless device 605 depending on its capability, complexity and battery saving needs.

In case PDSCH interference is present, wireless device 605 may perform cancellation of the first N strongest interferers following the above mentioned interference level ordering. N may be determined in any suitable manner. As one example, N may be configured by network 600. As another example, N may be autonomously decided by wireless device 605 according to any suitable criteria. For example, wireless device 605 may autonomously decide N based at least in part on one or more of wireless device 605's capability, complexity and battery saving needs.

Particular embodiments may allow wireless device 605 to detect the strongest interferers and order correctly the interferer levels depending on one or more granularity parameters (e.g., in some cases in terms of number of PRBs within the group). In certain embodiments, the one or more granularity parameters may be signaled by a network node, such as an eNodeB. For example, network node 610A may signal the one or more granularity parameters to wireless device 605. In certain embodiments, the one or more granularity parameters may be autonomously obtained by wireless device 605. By applying this methodology, wireless device 605 selects the strongest interferers within the group of PRBs, which results in more reliable blind detection of the transmission parameters associated with the interferers, which may be required for canceling or suppressing the interferers. More reliable blind detection may in turn result in better interferer channel estimation and eventually better demodulation performance. Additionally, certain embodiments may improve the demodulation performance and at the same time reduce the number of interferers to be cancelled in comparison with a methodology where the strongest to be cancelled are selected from wideband measurements.

The present disclosure contemplates that the embodiments described herein may be implemented in any suitable network node and/or a wireless device such as a UE. In certain embodiments, the network node may be a serving network node of wireless device 605. In certain embodiments, the network node may be a neighboring network node from which wireless device 605 can obtain information.

In some embodiments, a network node, such as network nodes 610, may indicate to wireless device 605 values of one or more of the interference mitigation assistance parameters and one or more granularity parameters. For example, network node 610 may indicate to wireless device 605 one or more of the parameters P, K and N. As described above, in certain embodiments P may be the number of interferers for which a wideband power measurement may be performed, K may be the amount of interferers for which wireless device 605 detects the presence of PDSCH (if needed, depending on the specific embodiments occurring in wireless device 605), and N may be the minimum number of interferers to cancel. In certain embodiments, the following property may apply: N<=K<=P. In some cases, the parameters may follow the rule N<K<P. In some cases the parameters may follow the rule N=K=P.

Network node 610 may indicate that the parameters N, K, and P (or any combination of those) may be autonomously defined by the UE 605. Wireless device 605 may acquire interference mitigation assistance parameters from network node 610 on the possibility to decide autonomously the values P, K, N, or any combination of those. In certain embodiments, wireless device 605 may autonomously decide the value of (any or any combination of) parameters P, K, N depending on remaining battery life, current consumption, complexity saving, and capability. For example, wireless device 605 may adjust its values independently for each "ordering chunk" as per embodiments described above, depending on the detected interference strength in order to save complexity.

Similarly, network node 610 may indicate one or more granularity parameters to wireless device 605. The granularity parameters may indicate which frequency granularity and/or time domain granularity should be used to order the interferer levels. This may be termed an "ordering chunk." In certain embodiments, the frequency granularity may be determined per PRB or any group of PRBs within an allocated bandwidth; and the time domain granularity may be per slot or per subframe or a group of subframes. In some embodiments, network node 610 may indicate to wireless device 605 that the granularity used to order the interferer levels should follow information related to NC resource scheduling. For example, in certain embodiments the granularity may follow NC resource allocation type, NC localized or distributed mapping, RBG, PRB bundling size or sub-bands.

Wireless device 605 may acquire information related to the granularity of the ordering in any suitable manner. As one example, wireless device 605 may acquire information related to the granularity of the ordering via implicit information derived from signaling, such as for example neighbor cell resource allocation type, localized or distributed mapping, or RBG, PRB bundling size or sub-bands, or any other suitable methodologies. As another example, wireless device 605 may autonomously decide the granularity of the ordering according to a fixed value. In certain embodiments, wireless device 605 may apply a successive refinement algorithm in order to find optimal ordering granularity. For example, wireless device 605 may apply a successive refinement algorithm based on first detecting the presence of the PDSCH by considering a certain hypothesis on the granularity (e.g. per PRB), and then adjusting the ordering granularity hypothesis by taking into account one or more suitable characteristics. For example, the ordering granularity hypothesis may be adjusted by taking into account the channel delay spread, the per PRB interference ordering, and/or any other suitable measurements.

As described above, wireless device 605 may perform one or more steps in order to estimate the current (in frequency and/or time) strongest interferers that may need to be canceled. For example, in certain embodiments wireless device 605 may acquire interference mitigation assistance parameters from a network node, such as network node 610A, on parameters P, K, and/or N described above. In certain embodiments, wireless device 605 may determine one or more interfering cells for which a first strength measurement should be determined. The determination may be based at least in part on the one or more interference mitigation assistance parameters. For example, the determination of the number of interfering cells for which a first strength measurement should be determined may be based on P number of interferers. In some embodiments, the first strength measurement may be a measurement of averaged CRS interference power of P cells within scheduled bandwidth. In certain embodiments, wireless device 605 may estimate the narrowband power of these interferers based on static RSs (such as CRSs or CSI-RS), and may order the interferers by considering the estimation according to the configured granularity as indicated by network node 610A. In some cases K of such interferes may be considered.

Wireless device 605 may perform a second strength measurement on the considered K interferers. The second strength measurement may be a determination of the presence of PDSCH interference, and may be accomplished by estimating the covariance matrix according to the configured granularity for the first K strongest interferers. In certain embodiments, if PDSCH interference is present, wireless device 605 may perform cancellation of the first N strongest interferers following the above mentioned interference level ordering, where N may be configured by the network. In some embodiments, wireless device 605 may perform interferer ordering based on the configured (group of) PRBs using PDSCH REs as opposed to static signal such as CRSs and or CSI-RS.

Although some embodiments are described as relating to mitigation of interference received from interfering cells at the wireless device receiver when wireless device 605 receives a signal from cell(s) on one carrier (e.g., serving cell or neighboring cells on primary carrier or primary serving carrier), the present disclosure contemplates that the described embodiments may be applicable for interference mitigation of interfering signals received by wireless device 605 on cells of secondary carrier frequency, on cells of plurality of secondary carrier frequencies, or on cells of any number or combination of primary or secondary carrier frequencies.

As described above, embodiments of network 600 may include one or more wireless devices 605 and one or more different types of network nodes 610 capable of communicating with wireless devices 605. Network 600 may also include any additional elements suitable to support communication between wireless devices 605 or between wireless device 605 and another communication device (such as a landline telephone). Wireless device 605 may include any suitable combination of hardware and/or software. For example, in particular embodiments, wireless device 605 may include the components described with respect to FIG. 9 below. Similarly, a network node 610 may include any suitable combination of hardware and/or software. For example, in particular embodiments, a network node may include the components described with respect to FIG. 10 below.

Figure 7:
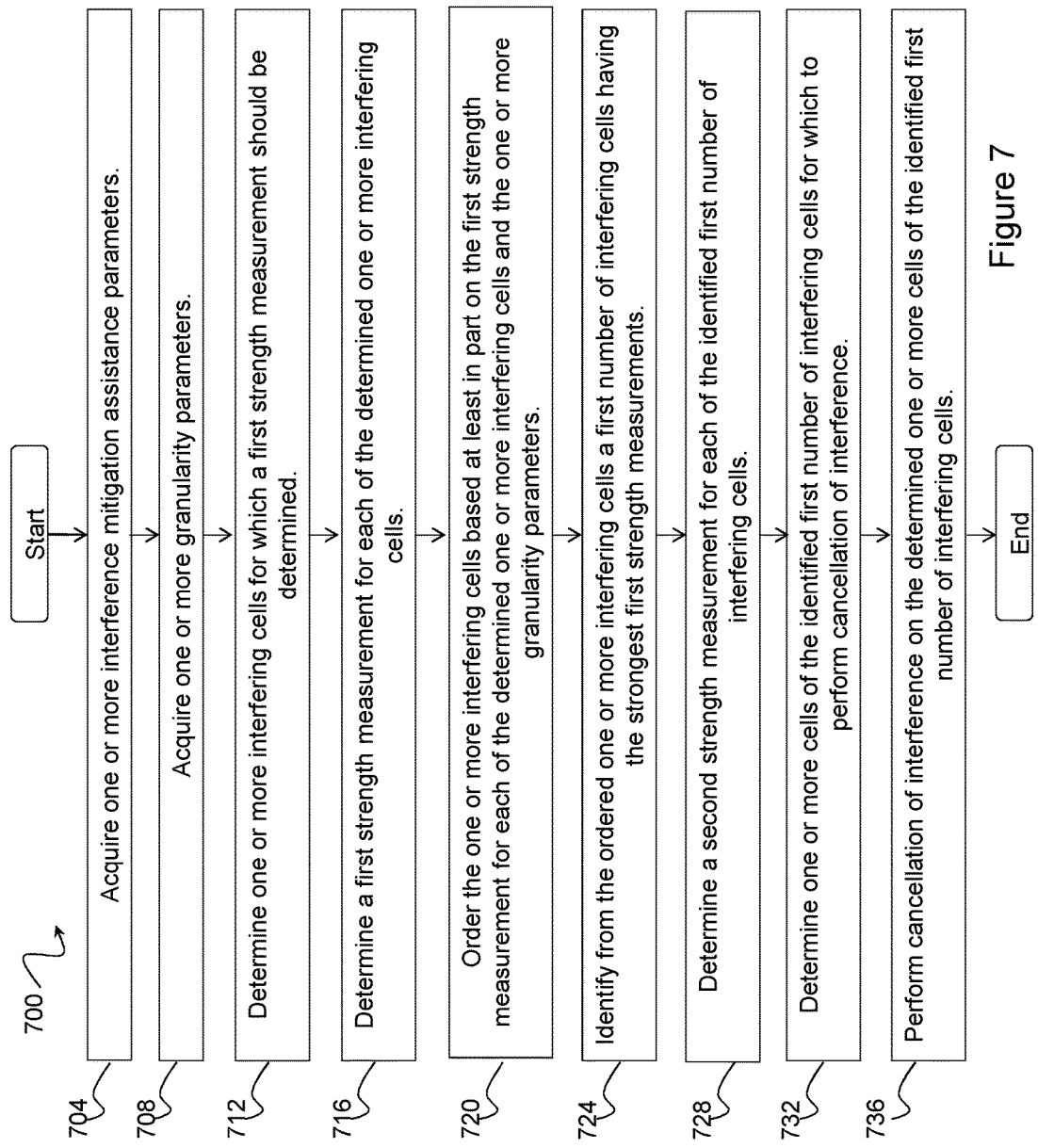
FIG. 7 is a flow diagram illustrating a method in a user equipment, according to an embodiment.

FIG. 7 is a flow diagram illustrating a method 700 in a user equipment, according to a particular embodiment. The method begins at step 704, where one or more interference mitigation assistance parameters are acquired. In certain embodiments, the user equipment may acquire the one or more interference mitigation assistance parameters from a network node. In certain embodiments, the user equipment may autonomously define the one or more interference mitigation assistance parameters. The interference mitigation assistance parameters may include one or more of a number of interfering cells for which a wideband power measurement should be performed by the user equipment, a number of interfering cells for which the user equipment detects the presence of interference on one or more channels, and a number of interfering cells for which the user equipment performs cancellation of interference. In certain embodiments, the one or more interference mitigation assistance parameters may be defined based at least in part on one or more of a remaining battery life, a current consumption, complexity saving, and capability.

At step 708, one or more granularity parameters are acquired. The one or more granularity parameters may be selected from a group including a frequency granularity and a time domain granularity. In certain embodiments, the one or more granularity parameters may be received from a network node. In acquiring the one or more granularity parameters the user equipment may receive an indication from a network node that the granularity used to order the one or more interfering cells should follow information related to resource scheduling. The one or more granularity parameters may be determined at the user equipment based at least in part on information derived from signaling. In certain embodiments, in acquiring one or more granularity parameters, the user equipment may autonomously determine the one or more granularity parameters according to a fixed value.

At step 712, the user equipment determines one or more interfering cells for which a first strength measurement should be determined. The determination of the one or more interfering cells for which a first strength measurement should be determined may be based at least in part on the one or more interference mitigation assistance parameters. At step 716, the user equipment determines a first strength measurement for each of the determined one or more interfering cells. In certain embodiments, the first strength measurement may be based at least in part on one or more reference symbols commonly available in a cell. The first strength measurement may be a measurement of an averaged cell-specific reference signal interference power of each of the determined one or more interfering cells within scheduled bandwidth.

At step 720, the one or more interfering cells are ordered based at least in part on the first strength measurement for each of the determined one or more interfering cells and the one or more granularity parameters. In certain embodiments, in performing steps 716 and 720, the user equipment may estimate the narrowband power of the one or more interfering cells based at least in part on one or more static reference symbols, and consider the estimation of the narrowband power of the one or more interfering cells according to the one or more granularity parameters. The ordering of the one or more interfering cells may be based at least in part on a configured group of physical resource blocks using a primary downlink shared channel resource elements.

At step 724, the user equipment identifies from the ordered one or more interfering cells a first number of interfering cells having the strongest first strength measurements. The first number may be based in part on the one or more interference mitigation assistance parameters. In certain embodiments, the user equipment may determine the strongest interfering cell of the ordered one or more interfering cells.

At step 728, a second strength measurement for each of the identified first number of interfering cells is determined. The second strength measurement may be based at least in part on an actual transmitted physical downlink shared channel power of the identified first number of interfering cells. At step 732, the user equipment determines one or more cells of the identified first number of interfering cells for which to perform cancellation of interference. In certain embodiments, the user equipment may determine whether interference is present on one or more channels, such as a physical downlink shared channel. In determining whether interference is present on one or more channels, the user equipment may estimate a covariance matrix for the determined one or more cells of the identified first number of interfering cells. At step 620, cancellation of interference on the determined one or more cells of the identified first number of interfering cells is performed.

Figure 8:
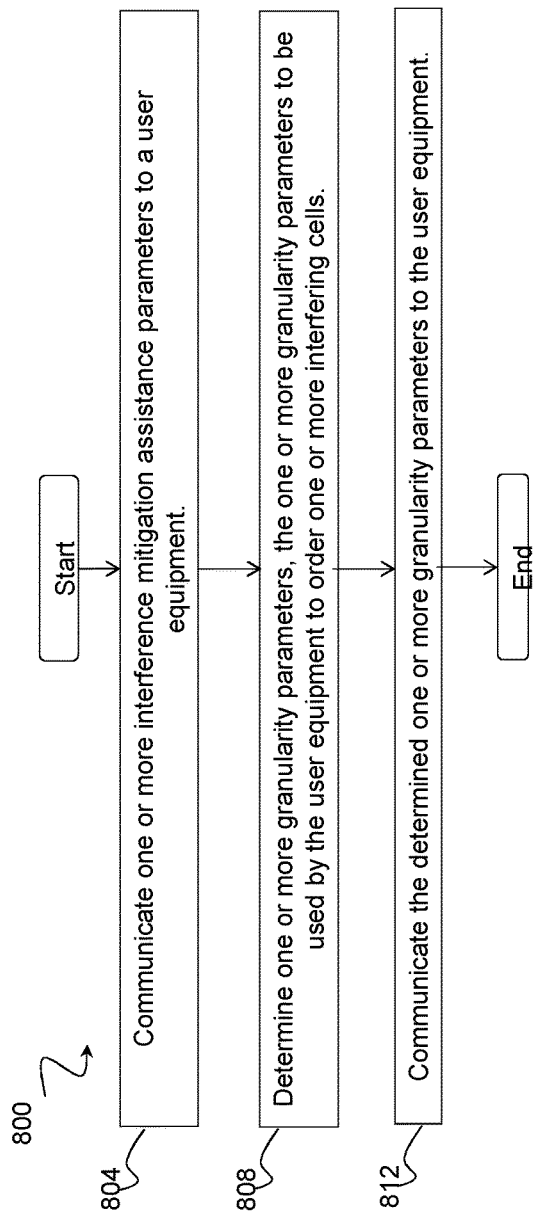
FIG. 8 is a flow diagram illustrating a method in a network node, according to an embodiment.

FIG. 8 is a flow diagram illustrating a method 800 in a network node, according to a particular embodiment. The method begins at step 804, when one or more interference mitigation assistance parameters are communicated to a user equipment. In certain embodiments, the network node may be a serving network node of the user equipment. The network node may be a cell on a primary carrier. The one or more interference mitigation assistance parameters may include one or more of a number of interfering cells for which a wideband power measurement should be performed by the user equipment, a number of interfering cells for which the user equipment detects the presence of interference on one or more channels, and a number of interfering cells for which the user equipment performs cancellation of interference. In certain embodiments, the one or more interference mitigation assistance parameters may be an instruction for the user equipment to autonomously define one or more of a number of interfering cells for which a wideband power measurement should be performed by the user equipment, a number of interfering cells for which the user equipment detects the presence of interference on one or more channels, and a number of interfering cells for which the user equipment performs cancellation of interference. The one or more channels may include a physical downlink shared channel.

At step 808 one or more granularity parameters are determined. The one or more granularity parameters may be for use by the user equipment to order one or more interfering cells. In certain embodiments, the one or more granularity parameters are selected from a group including a frequency granularity and a time domain granularity. The frequency granularity may be per physical resource block or any group of physical resource blocks within an allocated bandwidth. The time domain granularity may be per slot, per subframe, or a group of subframes. In certain embodiments, the one or more granularity parameters may be an indication to the user equipment that a granularity used to order the one or more interferers should be based at least in part on information related to resource scheduling. The information related to resource scheduling may include one or more of resource allocation type, localized mapping, distributed mapping, resource block group, physical resource block bundling size, or sub-bands. At step 812, the determined one or more granularity parameters are communicated to the user equipment.

Figure 9:
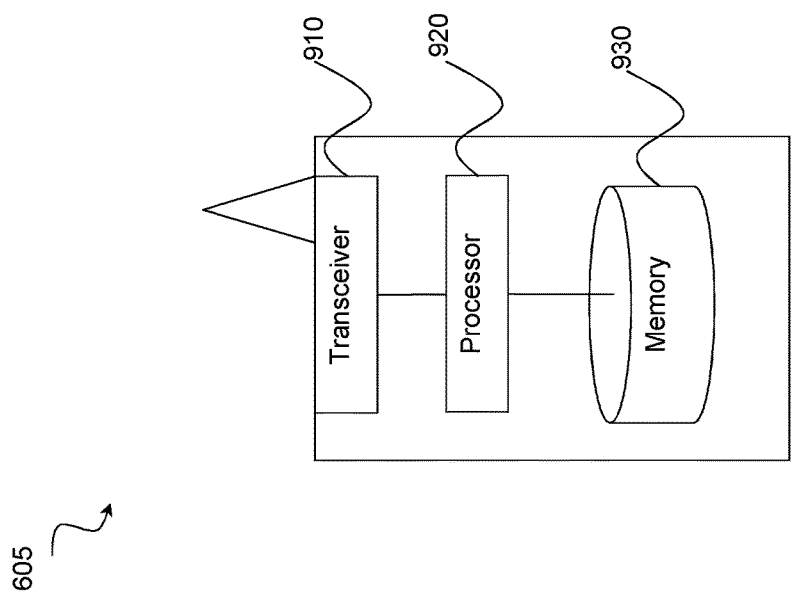
FIG. 9 is a block diagram illustrating a wireless device, according to certain embodiments.

FIG. 9 is a block diagram illustrating a wireless device 605, according to certain embodiments. Examples of wireless device 605 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, other wireless device capable of D2D operation, or other device that can provide wireless communication. Wireless device 605 may also be referred to as a user equipment (UE), a station (STA), or a terminal in some embodiments. Wireless device 605 includes transceiver 910, processor 920, and memory 930. In some embodiments, transceiver 910 facilitates transmitting wireless signals to and receiving wireless signals from an access node (e.g., via an antenna), processor 920 executes instructions to provide some or all of the functionality described above as being provided by wireless devices, and memory 930 stores the instructions executed by processor 920.

Processor 920 may include any suitable combination of hardware and software implemented in one or more modules to execute instructions and manipulate data to perform some or all of the described functions of wireless device 605. In some embodiments, processor 920 may include, for example, one or more computers, one or more central processing units (CPUs), one or more microprocessors, one or more applications, and/or other logic. Processor 920 may include analog and/or digital circuitry configured to perform some or all of the described functions of mobile device 605. For example, processor 920 may include resistors, capacitors, inductors, transistors, diodes, and/or any other suitable circuit components.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 605 may include additional components beyond those shown in FIG. 9 that may be responsible for providing certain aspects of the wireless device's functionality, including any of the stronger interferer detection functionality described above and/or any additional functionality (including any functionality necessary to support the solution described above).

In certain embodiments, wireless device 605 may include one or more modules. For example, wireless device 605 may include a determining module, a communication module, a receiver module, an input module, a display module, and any other suitable modules. The determining module may perform the processing functions of wireless device 605. For example, the determining module may acquire one or more interference mitigation assistance parameters and one or more granularity parameters, and determine one or more interfering cells for which a first strength measurement should be determined. The determining module may also determine a first strength measurement for each of the determined one or more interfering cells, order the one or more interfering cells based at least in part on the first strength measurement for each of the determined one or more interfering cells, and identify from the ordered one or more interfering cells a first number of interfering cells having the strongest first strength measurements. Other functions of the determining module may include determining a second strength measurement for each of the identified first number of interfering cells, determining one or more cells of the identified first number of interfering cells for which to perform cancellation of interference, and performing cancellation of interference on the determined one or more cells of the identified first number of interfering cells.

The determining module may include or be included in processor 920. The determining module may include analog and/or digital circuitry configured to perform any of the functions of the determining module and/or processor 920. The functions of the determining module described above may, in certain embodiments, be performed in one or more distinct modules. As non-limiting examples, in certain embodiments wireless device 605 may include one or more of a strength measurement module, an identification module, an interference cancellation module, or any other suitable module, each of which may perform one or more of the determining module functions described above.

The communication module may perform the transmission functions of wireless device 605. For example, the communication module may transmit messages to one or more of network nodes 610 of network 600. The communication module may include a transmitter and/or a transceiver, such as transceiver 910. The communication module may include circuitry configured to wirelessly transmit messages and/or signals. In particular embodiments, the communication module may receive messages and/or signals for transmission from the determining module.

The receiving module may perform the receiving functions of wireless device 605. For example, the receiving module may receive interference mitigation assistance parameters and/or granularity parameters from one or more of network nodes 610 of network 600. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 605. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 605. The display module may include the display and/or any appropriate circuitry and hardware configured to present signals on the display. The display module may receive signals to present on the display from the determining module.

Figure 10:
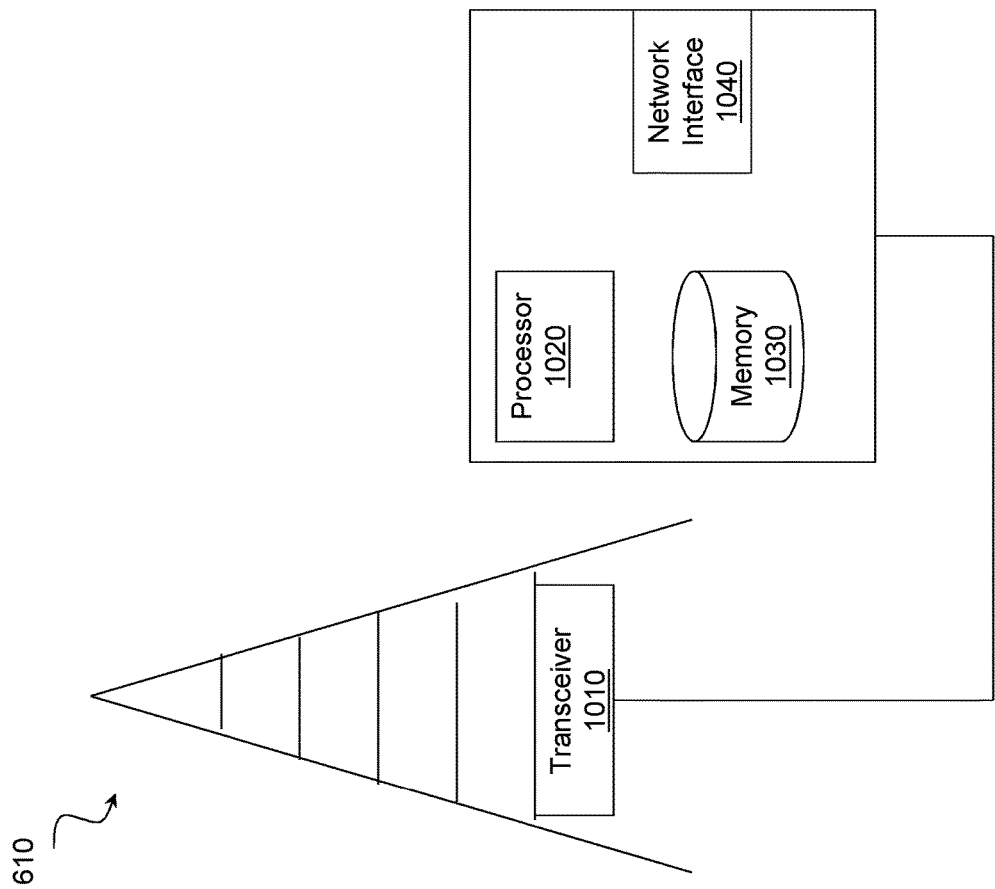
FIG. 10 is a block diagram illustrating a network node, according to certain embodiments.

FIG. 10 is a block diagram illustrating a network node 610, according to certain embodiments. Examples of network node 610 include an eNodeB, a node B, a base station, a wireless access point (e.g., a Wi-Fi access point), a low power node, a base station controller, a radio network controller, a relay, a donor node controlling relay, a base transceiver station (BTS), transmission points, transmission nodes, RRU, RRH, nodes in a distributed antenna system (DAS), a core network node, an MME, etc. Network node 610 may include one or more of transceiver 1010, processor 1020, memory 1030, and network interface 1040. In some embodiments, transceiver 1010 facilitates transmitting wireless signals to and receiving wireless signals from a wireless device (e.g., via an antenna), processor 1020 executes instructions to provide some or all of the functionality described above as being provided by an access node, memory 1030 stores the instructions executed by processor 1020, and network interface 1040 communicates signals to backend network components, such as a gateway, switch, router, Internet, Public Switched Telephone Network (PSTN), etc.

Processor 1020 may include any suitable combination of hardware and software implemented in one or more modules to execute instructions and manipulate data to perform some or all of the described functions of network node 610. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 610, send output from network node 610, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

In certain embodiments, network node 610 may include an interference mitigation assistance parameter module, a granularity parameter module, a communication module, a receiving module, and any other suitable modules. In some embodiments, one or more of the interference mitigation assistance parameter module, granularity parameter module, communication module, receiving module, or any other suitable module may be implemented using one or more processors 1020 of FIG. 10.

In general, the interference mitigation assistance parameter module may determine one or more interference mitigation assistance parameters, and the granularity parameter module may determine one or more granularity parameters. In certain embodiments, the functions of the interference mitigation assistance parameter module and the granularity parameter module may be combined into a single module. The communication module may communicate to the user equipment the one or more interference mitigation assistance parameters and/or the one or more granularity parameters. The receiving module may receive any suitable information from a user equipment.

Other embodiments of network node 610 may include additional components beyond those shown in FIG. 10 that may be responsible for providing certain aspects of the network node's functionality, including any of the interferer detection functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3rd Generation Partnership Project
BTS base transceiver station
COMP Coordinated multi-point transmission
CRS Cell-specific reference signal
CRS-IC CRS interference cancelation
CRS-IM CRS interference mitigation
CSI-RS Channel State Information RS
CWIC Codeword level interference cancelation
CFI Control format indicator
CRS AP CRS antenna ports
DAS Distributed antenna system
DPB Dynamic point blanking
DPS Dynamic point selection
DMRS Demodulation reference signal
DMRS APs DMRS antenna ports
EPRE Energy Per Resource Element
ePDCCH Enhance physical downlink control channel
IC Interference cancelation
LTE Long term evolution
MB SFN Multimedia Broadcast multicast service Single Frequency Network
MCS Modulation and Coding Scheme
MME Mobile Management Entity
NAICs Network-assisted interference cancelation
NJT Non-coherent Joint TX
PBCH Physical broadcast channel
PDSCH Physical downlink share channel
PDCCH Physical downlink control channel
PQI PDSCH mapping and quasi-co-location information
PSS Primary synchronization signal
PMI Precoding matrix index
RI Rank indicator
RNTI Radio Network Temporary Identifier
RRU Remote Radio Unit
RRH Remote Radio head
SLIC Symbol level interference cancelation
SSS Secondary synchronization signal
SCID Scrambling identity
TM Transmission mode
UE User Equipment
3GPP 3rd Generation Partnership Project
E-UTRA Evolved Universal Terrestrial Radio Access
eNB E-UTRAN Node B
PSS Primary synchronization signals
SSS Secondary synchronization signals
PBCH Physical broadcast channel
PDSCH Physical downlink share channel PDCCH Physical downlink control channel
ePDCCH Enhanced downlink control channel
QCL Quasi co-located
NAIC Network assistant interference cancelation
COMP Coordinated Multi-Point transmission
LTE Long Term Evolution
FeICIC Further enhanced inter-cell interference coordination
UE User equipment
CRS Cell-specific reference signal
IC Interference cancellation
IM Interference mitigation

The invention claimed is:

1. A method in a user equipment, comprising:
acquiring one or more interference mitigation assistance parameters;
acquiring one or more granularity parameters;
determining one or more interfering cells for which a first strength measurement should be determined, the determination of the one or more interfering cells for which a first strength measurement should be determined based at least in part on the one or more interference mitigation assistance parameters;
determining a first strength measurement for each of the determined one or more interfering cells, wherein the first strength measurement is based at least in part on one or more reference symbols commonly available in a cell, wherein determining the first strength measurement comprises measuring an averaged cell-specific reference signal interference power of each of the determined one or more interfering cells within scheduled bandwidth;
ordering the one or more interfering cells based at least in part on the first strength measurement for each of the determined one or more interfering cells and the one or more granularity parameters;
identifying from the ordered one or more interfering cells a first number of interfering cells having the strongest first strength measurements;
determining a second strength measurement for each of the identified first number of interfering cells; wherein the second strength measurement is based at least in part on an actual transmitted physical downlink shared channel power of the identified first number of interfering cells;
determining one or more cells of the identified first number of interfering cells for which to perform cancellation of interference; and
performing cancellation of interference on the determined one or more cells of the identified first number of interfering cells.

2. The method of claim 1, wherein identifying from the ordered one or more interfering cells a first number of cells having the strongest first strength measurement further comprises:
determining a strongest interfering cell of the ordered one or more interfering cells.

3. The method of claim 1, wherein determining the first strength measurement for each of the determined one or more interfering cells and ordering the one or more interfering cells based at least in part on the first strength measurement for each of the determined one or more interfering cells and the one or more granularity parameters further comprises:
estimating a narrowband power of each of the determined one or more interfering cells based at least in part on one or more static reference symbols, the static reference symbols comprising cell-specific reference signals or channel-state-information reference signals; and
ordering the one or more interfering cells based at least in part on the estimated narrowband power of each of the determined one or more interfering cells according to the one or more granularity parameters.

4. The method of claim 1, wherein determining one or more cells of the identified first number of interfering cells for which to perform cancellation of interference further comprises:
determining whether interference is present on one or more channels.

5. The method of claim 4, wherein determining whether interference is present on one or more channels further comprises estimating a covariance matrix for the determined one or more cells of the identified first number of interfering cells.

6. The method of claim 1, wherein acquiring one or more interference mitigation assistance parameters further comprises:
receiving information from a network node, the information comprising one or more of:
a number of interfering cells for which a wideband power measurement should be performed by the user equipment;
a number of interfering cells for which the user equipment detects the presence of interference on one or more channels; and
a number of interfering cells for which the user equipment performs cancellation of interference.

7. The method of claim 1, wherein acquiring one or more interference mitigation assistance parameters further comprises:
autonomously defining, at the user equipment, the one or more interference mitigation assistance parameters, the one or more interference mitigation assistance parameters comprising:
a number of interfering cells for which a wideband power measurement should be performed by the user equipment;
a number of interfering cells for which the user equipment detects the presence of interference on one or more channels; and
a number of interfering cells for which the user equipment performs cancellation of interference.

8. The method of claim 1, wherein the one or more granularity parameters are selected from a group including a frequency granularity and a time domain granularity.

9. The method of claim 1, wherein acquiring one or more granularity parameters further comprises receiving one or more of the granularity parameters from a network node.

10. The method of claim 1, wherein acquiring one or more granularity parameters further comprises autonomously determining, by the user equipment, the one or more granularity parameters according to a fixed value.

11. The method of any of claims 1, wherein acquiring one or more granularity parameters further comprises:
applying a successive refinement algorithm; and
determining, by the user equipment, an optimal ordering granularity.

12. A user equipment, comprising:
one or more processors configured to:
acquire one or more interference mitigation assistance parameters;
acquire one or more granularity parameters;
determine one or more interfering cells for which a first strength measurement should be determined, the determination of the one or more interfering cells for which a first strength measurement should be determined based at least in part on the one or more interference mitigation assistance parameters;

determine a first strength measurement for each of the determined one or more interfering cells, wherein the first strength measurement is based at least in part on one or more reference symbols commonly available in a cell, wherein determining the first strength measurement comprises measuring an averaged cell-specific reference signal interference power of each of the determined one or more interfering cells within scheduled bandwidth;

order the one or more interfering cells based at least in part on the first strength measurement for each of the determined one or more interfering cells and the one or more granularity parameters;

identify from the ordered one or more interfering cells a first number of interfering cells having the strongest first strength measurements;

determine a second strength measurement for each of the identified first number of interfering cells; wherein the second strength measurement is based at least in part on an actual transmitted physical downlink shared channel power of the identified first number of interfering cells;

determine one or more cells of the identified first number of interfering cells for which to perform cancellation of interference; and perform cancellation of interference on the determined one or more cells of the identified first number of interfering cells.

13. The user equipment of claim 12, wherein the one or more processors configured to identify from the ordered one or more interfering cells a first number of cells having the strongest first strength measurement comprises one or more processors configured to determine a strongest interfering cell of the ordered one or more interfering cells.

14. The user equipment of claim 12, wherein the one or more processors configured to determine the first strength measurement for each of the determined one or more interfering cells and order the one or more interfering cells based at least in part on the first strength measurement for each of the determined one or more interfering cells and the one or more granularity parameters comprises one or more processors configured to:

estimate a narrowband power of each of the determined one or more interfering cells based at least in part on one or more static reference symbols, the static reference symbols comprising cell-specific reference signals or channel-state-information reference signals; and order the one or more interfering cells based at least in part on the estimated narrowband power of each of the determined one or more interfering cells according to the one or more granularity parameters.

15. The user equipment of claim 12, wherein the one or more processors configured to determine one or more cells of the identified first number of interfering cells for which to perform cancellation of interference comprises one or more processors configured to determine whether interference is present on one or more channels.

16. The user equipment of claim 15, wherein the one or more processors configured to determine whether interference is present on one or more channels comprises one or more processors configured to estimate a covariance matrix for the determined one or more cells of the identified first number of interfering cells.

17. The user equipment of claim 12, wherein the one or more processors configured to acquire one or more interference mitigation assistance parameters comprises one or more processors configured to receive information from a network node, the information comprising one or more of:
a number of interfering cells for which a wideband power measurement should be performed by the user equipment;
a number of interfering cells for which the user equipment detects the presence of interference on one or more channels; and
a number of interfering cells for which the user equipment performs cancellation of interference.

18. The user equipment of claim 12, wherein the one or more processors configured to acquire one or more interference mitigation assistance parameters comprises one or more processors configured to autonomously define, at the user equipment, the one or more interference mitigation assistance parameters, the one or more interference mitigation assistance parameters comprising:
a number of interfering cells for which a wideband power measurement should be performed by the user equipment;
a number of interfering cells for which the user equipment detects the presence of interference on one or more channels; and
a number of interfering cells for which the user equipment performs cancellation of interference.

19. The user equipment of claim 12 wherein the one or more granularity parameters are selected from a group including a frequency granularity and a time domain granularity.

20. The user equipment of claim 12, wherein the one or more processors configured to acquire one or more granularity parameters comprises one or more processors configured to receive one or more of the granularity parameters from a network node.

21. The user equipment of claim 12, wherein the one or more processors configured to acquire one or more granularity parameters comprises one or more processors configured to autonomously determine, by the user equipment, the one or more granularity parameters according to a fixed value.

22. The user equipment of claim 12, wherein the one or more processors configured to acquire one or more granularity parameters comprises one or more processors configured to:
apply a successive refinement algorithm; and
determine, by the user equipment, an optimal ordering granularity.

* * * * *